United States Patent [19]

Bird et al.

[11] 4,282,191

[45] Aug. 4, 1981

[54] ZINC REMOVAL FROM ALUMINATE SOLUTIONS

[75] Inventors: Robert D. Bird; Harry R. Vance, both of Portland, Tex.

[73] Assignee: Reynolds Metals Company, Richmond, Va.

[21] Appl. No.: 172,420

[22] Filed: Jul. 25, 1980

[51] Int. Cl.$^3$ ............................................... C01F 7/06
[52] U.S. Cl. ................................... 423/119; 423/121; 423/122; 423/561 B; 23/301; 23/305 A
[58] Field of Search ................ 423/119, 121, 122–124, 423/561 B; 23/301, 305 A

[56] References Cited

U.S. PATENT DOCUMENTS

| | | | |
|---|---|---|---|
| 1,013,511 | 1/1912 | Pipereaut et al. | 423/561 B |
| 1,228,119 | 5/1917 | Lawrie | 423/123 |
| 2,136,376 | 11/1938 | Howath et al. | 423/561 B |
| 2,885,261 | 5/1959 | Adams et al. | |
| 3,445,186 | 5/1969 | Hrishikesan | 423/121 |
| 3,469,935 | 9/1969 | Hrishikesan et al. | 423/122 |

FOREIGN PATENT DOCUMENTS 2126059 10/1972 France.
1373843 11/1974 United Kingdom.

*Primary Examiner*—Herbert T. Carter
*Attorney, Agent, or Firm*—Glenn, Lyne, Girard & McDonald

[57] ABSTRACT

In a process of the preparation of alumina from an alumina value containing material wherein a caustic sodium aluminate process liquor is subjected to a treatment to reduce the level of zinc impurity by the addition of ZnS seed in the presence of sulfide ion, the improvement comprising:

(I) forming the zinc sulfide seed a by process comprising the steps of:
  (A) dissolving ZnO in NaOH to produce a caustic $Na_2ZnO_2$ solution; and
  (B) reacting the solution of (A) with $Na_2S$ to form ZnS, the $Na_2S$ being present at a level sufficient to provide a concentration of $Na_2S$ of at least about 0.150 g/l of $Na_2S$ when the product of this step is added to the process liquor;
(II) adding the product of step (B) to the process liquor to precipitate as ZnS, zinc contained as sodium zincate in the process liquor; and
(III) filtering the process liquor to yield an $NaAlO_2$ liquor containing less than 15 mg/l and preferably below about 10 mg/l zinc as ZnO.

7 Claims, No Drawings

ZINC REMOVAL FROM ALUMINATE SOLUTIONS

BACKGROUND OF THE INVENTION

The present invention relates to an improved process for the removal of zinc as an impurity from process liquors in the preparation of alumina. The process is specifically useful in the treatment of Bayer process liquors.

DESCRIPTION OF THE PRIOR ART

In the preparation of alumina suitable for electrolytic treatment to produce metallurgical grade aluminum, it may be necessary to reduce the level of zinc in the alumina, e.g., from above about 300 PPM to below about 150-170 PPM of zinc present as ZnO.

In the most common commercial process for the preparation of alumina, the Bayer process, an aluminum bearing ore, usually a clay or bauxite, is crushed, digested with caustic to extract the alumina values, the digester product settled to separate the so-called mud from the liquor which contains the alumina values, the liquor filtered and the alumina isolated by subsequent precipitation and calcination steps. To provide alumina of sufficient purity as regards zinc, somewhere in this process chain the liquor must be treated to remove excess or "impurity level" zinc. Early processes to achieve this result used high levels of $Na_2S$ to precipitate the zinc, but corrosion problems made this method undesirable. Numerous processes have been suggested to accomplish this purification using lower levels of sulfide ion. One of these involves the addition of ZnS (zinc sulfide) seed, in the presence of lower levels of sodium sulfide ($Na_2S$), to the process to provide a site for the precipitation of the contaminating zinc as zinc sulfide.

Two such processes are described in U.S. Pat. No. 2,885,261 to Adams et al issued May 5, 1959 and French Pat. No. 2,126,059 issued Oct. 6, 1972.

According to the process described in U.S. Pat. No. 2,885,261, zinc sulfide seed prepared by an unspecified process is added to liquor exiting the settler stage of a Bayer process stream. This liquor as referred to in the patent as the clarified pregnant liquor and is commonly referred to as the settler overflow. The levels of ZnS seed added range from about 50 to 500 PPM and the precipitated zinc sulfide is removed in the filtering operation.

The process of French Pat. No. 2,126,059 adds the zinc sulfide seed at a level of between about 150-200 PPM to the settler feed slurry so that precipitated zinc sulfide is separated in the settler with the red mud. According to this disclosure, it is necessary, to obtain desirable results, that the seed has a large surface area. Accordingly, the seed is made by a process wherein a solution of zinc sulfate is neutralized to PH 7.1 with caustic to obtain a zinc hydroxide gel. The gel is then gradually added to a dilute solution of sodium sulfide and let stand for 12-24 hours. Although both of the foregoing processes provide useful and acceptable means for reducing the zinc levels in the Bayer liquor, the cost of the raw materials involved constitutes a substantial portion of the cost of operating the process. It has accordingly been long sought to find a way of reducing the zinc contamination in Bayer liquors using either lower cost materials or significantly lower amounts of similarly priced materials.

SUMMARY OF THE INVENTION

We have now discovered that it is possible to obtain satisfactory zinc removal in processes of the type described using zinc sulfide seed at a level about 1/10 of that used in the aforementioned prior art patents.

Thus what we describe herein is an improved process for the preparation of alumina from an alumina value containing material wherein the process liquor is subjected to a treatment to reduce the level of zinc impurity by the addition of ZnS seed in the presence of sulfide ion, wherein the improvement comprises:

(I) forming the zinc sulfide seed by a process comprising the steps of:
  (A) dissolving ZnO in NaOH to produce a caustic $Na_2ZnO_2$ solution; and
  (B) reacting the solution of (A) with $Na_2S$ to form ZnS, the $Na_2S$ being present at a level sufficient to provide a minimum concentration of $Na_2S$ of at least about 0.150 g/l of $Na_2S$ when the product of this step is added to the process liquor;
(II) adding the ZnS thus formed to the process liquor to precipitate as ZnS, zinc contained in the process liquor in the form of sodium zincate; and
(III) filtering the process liquor to yield an $NaAlO_2$ liquor containing less than about 15 mg/l and preferably below about 10 mg/l zinc as ZnO.

DETAILED DESCRIPTION OF THE INVENTION

According to the process of the instant invention, removal of zinc from the Bayer process stream is accomplished by addition of zinc sulfide to a so-called "clarified" pregnant liquor, i.e., the settler overflow which is referred to hereinafter as the "process liquor". This addition is accomplished in much the same fashion as described in U.S. Pat. No. 2,885,261, but at levels as low as 1/10 those suggested in that patent. Although it is not clearly understood why such low levels of seed operate so efficiently in the instant case while they did not in the situation of the referenced patent, it is believed that the method described herein for preparing the seed yields material of much higher activity and that the addition of the seed to the process liquor under conditions which provide a certain minimum concentration of $Na_2S$ in the mixture provide conditions which demonstrate the highly superior results achieved with the process of this invention.

SEED PREPARATION

Seed preparation is initiated by adding zinc oxide (ZnO) to a sodium hydroxide (NaOH) solution. The concentration of the NaOH solution must be sufficient to dissolve the zinc oxide and is preferably about 30% NaOH if up to 100 g/l of ZnO are to be dissolved. There is no upper limit on the NaOH concentration. The only criterion for the caustic solution is that it be sufficiently concentrated as to permit dissolution of adequate zinc oxide under the process conditions, whatever they may be, in given circumstance. Generally, this mixture is prepared by adding anywhere from about 10 to about 100 g/l of ZnO to a suitable NaOH solution. According to a preferred embodiment a 50% NaOH solution diluted 1:1 with water (i.e. a 30% caustic solution) is used and ZnO is dissolved therein at about 100° C. to a concentration of about 50 g/l of ZnO.

Upon dissolution of the ZnO a reaction occurs. The product of this reaction is a solution of $Na_2ZnO_2$ (sodium zincate) in NaOH.

The next step in the seed preparation process involves mixing of the sodium sulfide ($Na_2S$) and the $Na_2ZnO_2$ solution. Immediately upon the mixing of the $Na_2S$ and $Na_2ZnO_2$ the ZnS seed forms and will precipitate. The temperature of ZnS formation is relatively inconsequential, although ZnS formation at 70° to 88° C. seems to provide better filtration later in the process. The amount of $Na_2S$ added to the $Na_2ZnO_2$ solution must be sufficient to provide, after formation of the ZnS, and in combination with the residual $Na_2S$ already present in the process stream (settler overflow) at least about 0.15 g/l of $Na_2S$. It is highly preferred to maintain an $Na_2S$ concentration of between about 0.15 and about 0.18 g/l. The seed formed upon addition of the $Na_2S$ can be used immediately or held for periods of up to several days with no apparent negative effect upon the activity of the seed. According to a preferred embodiment, the seed is formed immediately prior to use and is fed directly into the process stream. This permits almost continuous monitoring of the residual $Na_2S$ concentration in the process stream and the continuous addition of $Na_2S$ to the seed preparation reaction in an amount sufficient to provide the aforementioned minimum 0.15 g/l $Na_2S$ concentration upon addition of the seed to the process stream. In a commercial operation, it is preferred to maintain this minimum concentration of $Na_2S$ at at least about 0.15 g/l, as this seems to provide optimum results and makes the process easier to monitor and control.

SEED ADDITION

Addition of the ZnS seed preparation is accomplished simply by adding the preparation to the process stream in a concentration sufficient to provide at least about 5 mg/l of seed in the stream. According to a preferred embodiment from about 5 to about 40 mg/l of seed are used in the stream. At levels below about 5 mg/l zinc removal is insufficient, while at levels above about 40 mg/l, the significant economic advantages obtainable with the present invention begin to diminish, although one could use much higher levels of seed prepared as described herein and achieve highly useful results.

In the conventional Bayer process, it is well known that the so-called clarified liquor which emerges from the settler overflow in fact contains up to 400 mg/l of red mud. To eliminate this material it is conventional practice to add some type of filter aid to the process liquor at this point and to then pass the liquor through a polishing filter to remove the residual mud. A conventional filter aid material, tricalcium aluminate is obtained by adding lime, i.e. calcium oxide, to the liquor just before filtration and permitting the lime to react with the liquor for a period of time, normally from about 40 to 90 minutes.

It has been found that addition of lime to the process liquor may inhibit the ZnS seed prepared and added as described hereinabove. Thus, if optimum results are to be obtained it is essential that the seed be permitted to contact the process liquor for a period of from about 20 to about 100 minutes before any filter aid, which inactivates the seed, is added to the liquor. The reaction or retention time will, of course, depend to some extent on the amount of ZnO in the liquor and the level to which this concentration is to be reduced, however, the above specified periods will normally be acceptable for most applications.

If a compatible filter aid, i.e. one which does not inactivate the seed is used, the filter aid addition could of course take place simultaneously with the seed addition.

FILTRATION

After the seed and process liquor have been in contact for an appropriate period of from about 20 to 100 minutes and preferably between about 40 and 80 minutes any inactivating filter aid may then be added and, according to conventional practice, the liquor filtered in a polishing filter.

Treatment as just described will yield a liquor containing less than 15 mg/l of zinc as ZnO. Such a liquor will yield a product which, upon calcination, is acceptable for use in the electrolytic treatment of alumina and the production of metallurgical grade aluminum.

The following examples will serve to better illustrate the successful practice of the invention.

EXAMPLES

In all of the following examples Bayer process settler overflow (SOF) liquor was treated as described and filtration accomplished using a vertical leaf pressure filter using conventional plant filter cloth. Table I shows in graphic form the results of all of the tests.

EXAMPLE 1

$Na_2S$ was added directly to the SOF at a level of 0.100 g/l. After filtration, no zinc removal was observed.

EXAMPLE 2

In this case, 0.100 g/l $Na_2S$ in combination with, but without direct mixing with, 47.7 mg/l based on ZnO of sodium zincate was added to the SOF. After filtration no zinc removal was observed.

EXAMPLE 3

Freshly precipitated ZnS prepared by adding 5 ml of a 16 g/l $Na_2S$ solution to 5ml of a sodium zincate solution at 16 g/l based on ZnO was added to a process liquor maintained at 0.100 g/l $Na_2S$. Upon filtration, zinc was removed down to 12.6 mg/l ZnO in the filtrate.

Because the test example 3 showed a somewhat lower than optimum filtration rate, for Examples 4-10 the sodium zincate solution was heated to between 70° and 80° C. prior to addition of the sodium sulfide.

EXAMPLE 4

Example 3 was repeated with the process modification just described. The filtration rate improved to a more acceptable level and zinc removal to a level of 14.2 mg/l was experienced.

EXAMPLE 5

The example was conducted with a total process stream addition of 0.107 g/l $Na_2S$, freshly prepared ZnS added at 12 mg/l and the reaction allowed to proceed for 50 minutes. A conventional lime slurry was then added and allowed to react for 70 minutes. A good filtration rate was observed and Zn was removed down to a level of 12.5 mg/l.

EXAMPLE 6

Treatment was performed with Na$_2$S at 0.130 g/l and ZnS at 12 mg/l of SOF. Zinc was removed down to 12.1 mg/l ZnO in the filtrate.

EXAMPLE 7

Treatment was performed with an Na$_2$S concentration of 0.130 g/l and ZnS added at 6 mg/l of SOF. Upon filtration, zinc was removed down to 10.1 mg/l ZnO in the filtrate.

EXAMPLE 8

This test was conducted with a starting sulfide concentration 0.137 g/l Na$_2$S, 6 mg/l ZnS seed and the reaction time after seeding with ZnS was extended from 50 minutes to 80 minutes. Upon filtration, zinc was removed from the liquor down to 11.0 mg/l ZnO.

EXAMPLE 9

This test was conducted with a starting sulfide concentration of 0.250 g/l Na$_2$S and ZnS added at 6 mg/l of SOF. Upon filtration, zinc was removed from the liquor down to 5.3 mg/l ZnO.

For examples 10–15 the following procedure was followed:

PROCEDURE

1. Sodium zincate solutions of 10 and 50 g/l ZnO were prepared in 25% NaOH solution. The 100 g/l ZnO sodium zincate was prepared in 30% NaOH. It would not dissolve in 25% NaOH.
2. SOF liquor was analyzed for residual sodium sulfide. The sodium sulfide concentration was adjusted to the desired level by adding sodium sulfide solution.
3. Eight liters of SOF liquor were poured into a Lab pressure vessel containing a submerged vertical leaf filter (1 square inch) fitted with plant filter cloth. The vessel has a submerged thermowell for temperature measurement and a stirrer fitted with a packing gland to prevent pressure loss when filtering.
4. The vessel was closed and heated to 102° C. while stirring. A vent remained open to prevent pressure build-up until ready for test. The stirrer speed used was 369 RPM throughout each test.
5. Zinc sulfide seed was prepared by adding the required amount of sodium sulfide solution to a sodium zincate solution that was at a temperature of 25°, 50°, or 75° C. and mixed for twenty-five (25) minutes before adding to the SOF liquor for precipitation of zinc. The zinc sulfide seed dosage was 10 mg/l settler overflow liquor.
6. Lime slurry was added to the liquor to produce a dosage of 500 mg/l filter aid. The lime slurry was allowed to mix with the liquor for seventy (70) minutes in all of the tests while at reaction temperature of 102° C.
7. Pressure was applied to the vessel at 50 psi with nitrogen after vent hose was capped.
8. The filtrate was collected in a 1000 ml graduated cylinder and the time recorded for each liter of filtrate.
9. Samples of the filtrate were taken at three intervals, 900 to 1000 ml; 1900 to 2000 ml; and 2900 to 3000 ml.
10. After three liters of filtrate were obtained, the test was stopped.
11. The filtrates and the SOF liquor were analyzed for zinc.
12. Each filtrate sample was analyzed for ZnO and the last filtrate sample was analyzed for residual sulfide.

EXAMPLE 10

The zinc sulfide seed was prepared by the reaction of a 10 g/l sodium zincate solution with the stoichiometric requirement of sodium sulfide at 25° C. for (25) twenty five minutes. The sodium sulfide necessary to adjust the settler overflow liquor from 0.105 g/l to 0.180 g/l was added to the seed mixture. This resulted in about seven times excess of sodium sulfide in the mixture. This produced a zinc level in the filtrate of 8.7 mg/l ZnO, with zinc sulfide seed prepared at 25° C.

EXAMPLES 11 AND 12

These tests were with 50 g/l ZnO sodium zincate solution reacted with sodium sulfide at 75° C. using stoichiometric requirements. With Example 11, the sodium sulfide was added to the sodium zincate. In Example 12, the sodium zincate was added to the sodium sulfide. Both methods of zinc sulfide seed prepared performed very well in removing zinc from the filtrate, however, the reverse mixing, Example 12, gave a considerably lower zinc level, i.e., 7.1 mg/l ZnO for Example 11 and 4.4 mg/l ZnO for Example 12.

EXAMPLES 13 AND 14

Still using 50 g/l ZnO sodium zincate solution with sodium sulfide, but at 25° C. mixing temperature. Example 13 had stoichiometric requirement of sodium sulfide, while Example 14 had an excess of about seven times the requirement, i.e., the sulfide that would have been used to adjust the settler overflow residual sulfide from 0.107 to 0.180 g/l. Both methods of mixing the reactants behaved very favorable in preparing active zinc sulfide seed at 25° C. for zinc removal, to levels of 5.2 and 6.8 mg/l ZnO respectively.

EXAMPLE 15

In this Example, 100 g/l sodium zincate were used to prepare the zinc sulfide seed using stoichiometric requirement of sodium sulfide at 75° C. This was also mixed for (25) twenty-five minutes at temperature before adding to settler overflow liquor adjusted from 0.116 g/l Na$_2$S to 0.180 g/l Na$_2$S. This seed resulted in lowering zinc level to 9.7 mg/l.

EXAMPLE 16

Plant Operation

The test reported in this Example was performed on a full plant scale to determine the ability of the invention to perform in an operational environment.

Normal operation of the Bayer Plant used for the test over an eight month period averaged 3278 M$^3$ flow per hour of settler overflow liquor which contained an average of 0.140 g/l Na$_2$S and 18.9 g/l ZnO. An average of 0.175 g/l Na$_2$S was added to this SOF and precipitated ZnS which was removed by filtration. The clear liquor to precipitator filtrate contained 0.294 g/l Na$_2$S and 8.1 mg/l ZnO. The same plant was operated for 54 hours using the process modification of the present invention. The average flow of SOF was 3503 M$^3$/hr. and contained 0.122 g/l Na$_2$S and 22.0 mg/l ZnO. In the test ZnS seed produced as described hereinabove was added at a level of 5 mg/l and Na$_2$S added at a level of 0.046 g/l to the SOF. The ZnO in the liquor was precipitated as ZnS and filtered to give a clear liquor containing 7.4 mg/l ZnO and 0.151 g/l Na₂S.

sodium aluminate process liquor is subjected to a treatment to reduce the level of zinc impurity by the addi-

TABLE I

| Test # | SOF Na₂S g/l | SOF Na₂S Adj. to g/l | SOF ZnO mg/l | SOF ZnO Adj. to mg/l | ZnS Added mg/l of SOF | Reaction Time After ZnS Added Min. | Lime Reaction Time Min. | Filt. Residual Na₂S g/l | Filtrate ZnO After 11 mg/l | Filtrate ZnO After 21 mg/l | Filtrate ZnO After 31 mg/l | Filtration Rate 11 Min. | Filtration Rate 21 Min. | Filtration Rate 31 Min. |
|---|---|---|---|---|---|---|---|---|---|---|---|---|---|---|
| 1 | .100 | .100 | 23.8 | 23.8 | 0 | 30 | 60 | .094 | 21.4 | 20.8 | 20.6 | 6.2 | 25.3 | 56.0 |
| 2 | .099 | .099 | 27.7 | 47.7 | 0 | 30 | 60 | .092 | 46.7 | 45.1 | 44.4 | 5.8 | 24.8 | 54.0 |
| 3 | .066 | .100 | 25.8 | 25.8 | 12 | 30 | 60 | .089 | 14.0 | 13.5 | 12.6 | 12.2 | 52.5 | 121.0 |
| 4 | .108 | .108 | 29.5 | 29.5 | 12 | 60 | 60 | .093 | 16.5 | 16.0 | 14.2 | 8.7 | 37.1 | 83.0 |
| 5 | .107 | .107 | 26.9 | 26.9 | 12 | 50 | 70 | .098 | 14.2 | 13.0 | 12.5 | 4.5 | 23.0 | 57.0 |
| 6 | .099 | .130 | 29.8 | 29.8 | 12 | 50 | 70 | .112 | 13.5 | 12.3 | 12.1 | 9.1 | 38.2 | 88.0 |
| 7 | .124 | .130 | 23.2 | 23.2 | 6 | 50 | 70 | .118 | 11.5 | 10.5 | 10.1 | 8.2 | 34.5 | 78.0 |
| 8 | .137 | .137 | 29.1 | 29.1 | 6 | 80 | 70 | .115 | 12.1 | 11.6 | 11.0 | 8.0 | 29.4 | 65.0 |
| 9 | .149 | .250 | 23.0 | 23.0 | 6 | 50 | 70 | .237 | 7.3 | 5.5 | 5.3 | 5.4 | 21.8 | 49.0 |
| 10 | .105 | .180 | 19.49 | 19.49 | 10 | 50 | 70 | .190 | 8.28 | 6.80 | 10.90 | 3.8 | 16.7 | 31.3 |
| 11 | .124 | .180 | 20.09 | 20.09 | 10 | 50 | 70 | .185 | 8.73 | 7.65 | 4.92 | 3.5 | 11.2 | 20.0 |
| 12 | .092 | .180 | 19.40 | 19.40 | 10 | 50 | 70 | .204 | 5.64 | 4.64 | 3.08 | 5.5 | 33.6 | 65.0 |
| 13 | .105 | .180 | 19.49 | 19.49 | 10 | 50 | 70 | .174 | 6.11 | 5.37 | 4.20 | 4.5 | 23.2 | 43.75 |
| 14 | .107 | .180 | 21.00 | 21.00 | 10 | 50 | 70 | .187 | 7.95 | 7.05 | 5.56 | 7.6 | 25.6 | 43.0 |
| 15 | .116 | .180 | 21.04 | 21.04 | 10 | 50 | 70 | .139 | 9.36 | 8.79 | 10.99 | 4.6 | 13.3 | 20.0 |

We claim:

1. In a process for the preparation of NaAlO₂ from an alumina value containing material wherein a caustic sodium aluminate process liquor is subjected to a treatment to reduce the level of zinc impurity by the addition of ZnS seed in the presence of sulfide ion, the improvement comprising:

(A) forming the zinc sulfide seed by a process comprising the steps of:
(I) dissolving ZnO in NaOH to produce a caustic Na₂ZnO₂ solution; and
(II) reacting the solution of step (I) with Na₂S to form ZnS, the Na₂S being present at a level sufficient to provide a concentration of Na₂S of at least about 0.15 g/l of Na₂S when the product of this step is added to the process liquor;

(B) adding the product of step (II) to the process liquor to precipitate as ZnS, zinc contained in the process liquor in the form of sodium zincate; and (C) filtering the process liquor to yield an NaAlO₂ liquor containing less than about 15 mg/l zinc as ZnO.

2. In a process for the preparation of NaAlO₂ from an alumina value containing material wherein a caustic sodium aluminate process liquor is subjected to a treatment to reduce the level of zinc impurity by the addition of ZnS seed in the presence of sulfide ion, the improvement comprising (A) forming the zinc sulfide seed by a process comprising the steps of:
(I) dissolving ZnO in NaOH to produce a caustic Na₂ZnO₂ solution; and
(II) reacting the solution of step (I) with Na₂S to form ZnS, the Na₂S being present at a level sufficient to provide a concentration of Na₂S of at least about 0.15 g/l of Na₂S when the product of this step is added to the process liquor;

(B) adding the product of step (II) to the process liquor in an amount sufficient to provide a concentration of at least about 5 mg/l of ZnS to precipitate as ZnS, zinc contained in the process liquor in the form of sodium zincate; and (C) filtering the process liquor to yield an NaAlO₂ liquor containing less than 15 mg/l of zinc as ZnO.

3. In a process for the preparation of NaAlO₂ from an alumina value containing material wherein a caustic tion of ZnS seed in the presence of sulfide ion, the improvement comprising:

(A) forming the zinc sulfide seed by a process comprising the steps of:
(I) dissolving ZnO in NaOH to produce a caustic Na₂ZnO₂ solution; and
(II) reacting the solution of (I) with Na₂S to form ZnS, the Na₂S being added at a level sufficient to provide, a minimum concentration of Na₂S of at least about 0.15 g/l of Na₂S when the product of this step is added to the process liquor;

(B) adding the product of step (II) to the process liquor in amount sufficient to provide a concentration of at least about 5 mg/l to about 40 mg/l of ZnS to precipitate zinc contained in the process liquor in the form of sodium zincate as ZnS; and
(I) filtering the process liquor to yield an NaAlO₂ liquor containing less than 15 mg/l of zinc as ZnO.

4. In a process for the preparation of NaAlO₂ from an alumina value containing material wherein a caustic sodium aluminate process liquor is subjected to a treatment to reduce the level of zinc impurity by the addition of ZnS seed in the presence of sulfide ion, the improvement comprising:

(A) forming the zinc sulfide seed by a process comprising the steps of:
(I) dissolving from about 10 to about 100 g/l of ZnO in an at least about 25% NaOH solution to produce a caustic NA₂ZnO₂ solution; and
(II) reacting the solution of step (I) with Na₂S to form ZnS, the Na₂S being present at a level sufficient to provide, a concentration of Na₂S of at least about 0.15 g/l of Na₂S when the product of this step is added to the process liquor;

(B) contacting an amount of the product of step (II) with the process liquor in an amount sufficient to provide a concentration of between about 5 to about 40 mg/l of ZnS for a period of from about 20 to about 100 minutes to precipitate zinc contained in the process liquor in the form of sodium zincate as ZnS; and (C) filtering the process liquor to yield an NaAlO$_2$ liquor containing less than 15 mg/l zinc as ZnO.

5. The method of claims 1, 2, 3 or 4 wherein step I (B) is performed at a temperature of from about 50° C. to about 80° C.

6. The method of claims 1, 2, 3 or 4 wherein step I (A) is performed at a temperature of about 100° C.

7. The method of claims 1, 2, 3 or 4 wherein the NaAlO$_2$ liquor contains less than 10 mg/l zinc as ZnO.

* * * * *